Mar. 3, 1925.
D. W. TYRRELL
DRY BATTERY
Filed June 6, 1923
1,528,091
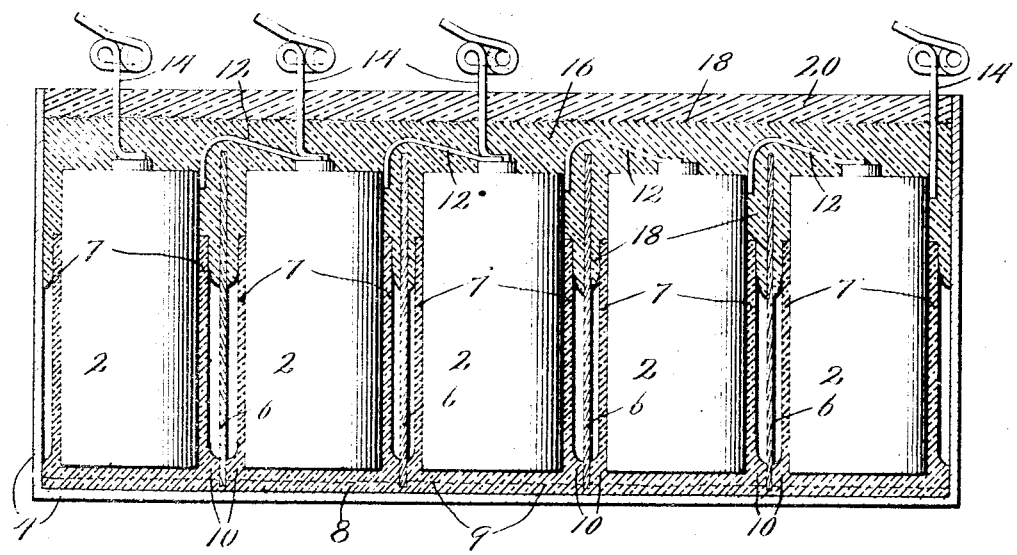
Inventor:
Donald W. Tyrrell
by Cheever & Cox
Attys Patented Mar. 3, 1925.

1,528,091

UNITED STATES PATENT OFFICE.

DONALD W. TYRRELL, OF MADISON, WISCONSIN, ASSIGNOR TO FRENCH BATTERY & CARBON COMPANY, OF MADISON, WISCONSIN, A CORPORATION OF WISCONSIN.

DRY BATTERY.

Application filed June 6, 1923. Serial No. 643,613.

*To all whom it may concern:*

Be it known that I, DONALD W. TYRRELL, a citizen of the United States, residing at Madison, in the county of Dane and State of Wisconsin, have invented a certain new and useful Improvement in Dry Batteries, of which the following is a specification.

This invention relates to dry batteries of the type now in common use for radio work and for lighting small electric lights used in electric lanterns and elsewhere. The object of this invention is to combine in a single battery a plurality of independent cells, usually of the type having a zinc external case and a carbon central terminal, together with the usual wires connecting them in series or parallel, as the case may be, so that the separate cells are thoroughly insulated from each other in the first instance and there is no chance for well-known chemical products exuding from the individual cells as they operate, interconnecting the cells and thereby partially or wholly ruining the whole battery.

The invention consists in a novel means for first insulating a large part of the outside of each individual cell with a coating of insulating material of more or less conventional form, arranging the separate cells in position in the battery case and then applying in plastic or soft condition a plate of insulating material which cooperates with the tops of the cells and the first mentioned insulating material in such manner that the ultimate desired result is obtained—this without in any way destroying the effect and efficiency of the first mentioned insulating coating as has frequently been the case in the prior art.

More specifically, the invention consists in first coating parts of the individual cells with an insulating material having a high melting point and finally, after the cells are grouped, coating the remainder of the cells with a plastic insulating material of substantially lower melting point than the first mentioned material, so that the second material can flow into cooperative relation with the cells insulated with the first material without destroying or disturbing said first mentioned insulating material.

The invention further consists in features and details of construction which will be hereafter more fully set forth in the specification and claim.

Referring to the single figure of the drawings, a group of separate cells 2 is shown in a suitable external case 4, there being, if desired, but not necessarily, between the separate cells partition members 6 of the egg case or other conventional form. Each individual cell 2 is, before being placed in the case 4, coated on its bottom and for a substantial distance up its sides with a protective insulating material 7 of suitable high melting composition. One material suitable for this purpose is a slow cooling rubbery compound, made from an asphalt base of high melting point, the same melting at from 250° to 300° F. Another such material is resin and paraffine melted together, the same being within 10% of equal proportions by weight. In actual practice, the cells 2 are dipped in such material and then placed singly or in groups inside the case 2, with or without the presence at that time of a plastic layer 8 of the same high melting point material into which the crate partitions 6 have previously been slightly pressed, with the result that some of this material 7 carried by the bottom of each cell intermixes with material 8, if present, along such a line as 9; and in any event flows into the space 10 between the cells, thus making an integral connection between the lower portions of the side walls and the bottoms of adjacent cells 2 as clearly shown in the drawings.

Having placed the cells 2, thus coated with high melting point material 7, in the case 4, they are electrically connected by wires 12 of conventional construction; equipped with lead-out terminals 14 of conventional construction, whereupon a quantity of much lower melting point insulating material 16 is applied over the tops of the individual cells under such conditions that parts of it will flow down between the tops of the cells 2 and between the top portions of the insulating material 7 to form the separating plugs or wedges 18, adapted, as clearly shown in the drawing, to cooperate with the insulating material 7 in separating and insulating the cells 2 from each other. The material 16 should be of such a comparatively low melting point that it may be caused to assume the position shown in the drawing without softening or otherwise destroying the upper or any portion of the high melting point insulating material 7.

When the battery of this invention has been constructed as just described, it may, if desired, be covered with a coating of cheese-cloth 18 and a layer of ordinary sealing wax 20, without novelty herein.

With the battery thus constructed, the cells 2 are thoroughly insulated from each other by a heavy coating of entirely surrounding insulating material which confines within each cell any chemical production of operation which, as is well understood in the art, frequently exudes from the various external surfaces and edges of individual cells and in the absence of such protection as here afforded, interconnects or short-circuits two or more cells.

Having thus described by invention, what I claim as new and desire to secure by Letters Patent is:

A dry battery comprising a case, a plurality of electrically connected, independent cells in said case, each having a side terminal and an end terminal, a coating of normally hard but meltable insulating material around the sides and under the bottom of each cell, and a closure of normally hard but meltable material over the tops of and between said cells contacting and interfitting with said first insulating coating, the melting point of the top insulating material being substantially less than the first mentioned insulating material, for the purposes set forth.

In witness whereof, I have hereunto subscribed my name.

DONALD W. TYRRELL.